United States Patent [19]
Hollis et al.

[11] Patent Number: 5,434,504
[45] Date of Patent: Jul. 18, 1995

[54] POSITION SENSORS FOR LINEAR MOTORS INCLUDING PLURAL SYMMETRICAL FLUXES GENERATED BY A PLANAR DRIVE COIL AND RECEIVED BY PLANAR SENSE COILS BEING COLINEAR ALONG AN AXIS OF MOTION

[75] Inventors: Ralph L. Hollis, Yorktown Heights; Jehuda Ish-Shalom, Croton-on-Hudson; Edward J. Yarmchuk, Mahopac, all of N.Y.

[73] Assignee: International Business Machines Corporation, Armonk, N.Y.

[21] Appl. No.: 130,228

[22] Filed: Oct. 1, 1993

[51] Int. Cl.⁶ .............................................. G01B 7/287
[52] U.S. Cl. ......................... 324/207.17; 324/207.24; 336/45
[58] Field of Search ..................... 324/207.22, 207.13, 324/207.17, 207.18, 207.19, 207.24, 228; 336/45; 318/652, 653, 661; 310/168; 340/870.31

[56] References Cited

U.S. PATENT DOCUMENTS

| | | |
|---|---|---|
| 2,989,711 | 6/1961 | Smith .............................. 324/207.18 |
| 3,137,812 | 6/1964 | Andresen ........................ 324/207.18 |
| 3,376,578 | 4/1966 | Sawyer . |
| 3,457,482 | 10/1967 | Sawyer . |
| 3,539,843 | 8/1968 | Pelenc . |
| 3,735,231 | 5/1973 | Sawyer . |
| 3,836,835 | 9/1974 | Sawyer . |
| 3,857,078 | 12/1974 | Sawyer . |
| 4,455,512 | 6/1984 | Cornwell et al. . |
| 4,458,168 | 7/1984 | Welburn . |
| 4,514,674 | 4/1985 | Hollis, Jr. et al. . |
| 4,535,289 | 8/1985 | Abe et al. ....................... 324/207.23 |
| 4,612,502 | 9/1986 | Spies .............................. 324/207.23 |
| 4,634,126 | 1/1987 | Kimura ........................... 324/207.18 |
| 4,636,666 | 1/1987 | Meins . |
| 4,649,340 | 3/1987 | Zabler ............................ 324/207.24 |
| 4,717,874 | 1/1988 | Ichikawa et al. ............... 324/207.24 |
| 4,737,698 | 4/1988 | McMullin et al. . |
| 4,772,815 | 9/1988 | Harned et al. . |
| 4,800,978 | 1/1989 | Wasa et al. ..................... 324/207.18 |
| 4,823,062 | 4/1989 | Hoffman et al. . |
| 4,893,071 | 1/1990 | Miller . |
| 4,914,390 | 4/1990 | Orlicki et al. .................. 324/207.17 |
| 4,935,676 | 6/1990 | Pelta . |
| 4,958,115 | 9/1990 | Miller . |
| 5,010,262 | 6/1992 | Jacobs . |
| 5,072,179 | 12/1991 | Miller et al. ................... 324/207.23 |

OTHER PUBLICATIONS

Zeevi, et al. (1982) "Measurement of Eye Movement with a Ferromagnetic Contact Ring", *IEEE Transactions on Biomedical Engineering*, vol. BME-29, No. 7.
Cushing, et al. (1984) "A New High Accuracy Angular Position Transducer", *Motor-Con 1984 Proceedings*, 283-289.
Goel, et al. (1990) "A Direct Drive Linear Servo Motor for High Speed Precise Positioning" *Intelligent Motion, Oct. 1990 Proceedings* 193-196.

*Primary Examiner*—Sandra L. O'Shea
*Assistant Examiner*—Roger Phillips
*Attorney, Agent, or Firm*—Scully, Scott, Murphy & Presser

[57] ABSTRACT

Position sensors for detecting the position of a linear motor relative to a platen are disclosed. In one embodiment, the sensor includes first and second magnetic members having teeth disposed relative to the teeth on the platen. A single turn planar drive winding is disposed around at least one of the teeth of the first and second magnetic members for producing a first and a second drive flux within each of the magnetic members. A single turn planar sense winding is disposed around at least one of the teeth of the first and second magnetic members for generating first and second outputs which are a periodic function of the position of the sensor relative to the platen. In another embodiment of the present invention, the sensor includes two magnetic members each having four pole pieces. A drive winding is disposed on each member for establishing first and second fluxes in each member which are symmetrical about a center of each member. A sense winding is wound around the center two poles of each member for measuring the relative flux therein and producing art output which is a periodic function of the position of the sensor relative to the platen.

31 Claims, 8 Drawing Sheets

POSITION SENSORS FOR LINEAR MOTORS INCLUDING PLURAL SYMMETRICAL FLUXES GENERATED BY A PLANAR DRIVE COIL AND RECEIVED BY PLANAR SENSE COILS BEING COLINEAR ALONG AN AXIS OF MOTION

BACKGROUND OF THE INVENTION

1. Field of the Invention

The present invention relates generally to position sensors and, more particularly, to sensors for sensing the position of a linear motor relative to a platen.

2. Description of the Prior Art

Linear motors are well known in the robotics art. For example, a Sawyer linear motor disclosed in U.S. Pat. No. 3,376,578 can provide linear motion over two mutually orthogonal directions in the plane and a small rotation in the plane. These electromagnetic linear motors move on an air bearing over a ferromagnetic platen with a cyclic magnetic pattern in it along its two planar axes. Currently, these linear motors are controlled as step motors with no position feedback.

With no position sensing, planar Sawyer motors are operated as step motors with a micro-stepping controller that has several limitations. The motor can lose synchronization when external forces are applied or when commanded to move at high speed. When the motor loses synchronization its position is no longer known and thus the motor system is unreliable. More common is for the motor to lose rotational synchronization which cannot be detected or corrected by the motor itself. The motor rotations cause loss of motor performance and position errors. As a result of open loop motor control with respect to position, the motor has a position error because of disturbing forces especially at steady-state and low frequency when acceleration and velocity feedback is not effective. In addition, the motor cannot be electronically commutated to obtain the maximum force. Moreover, the motor requires full current even when only low force is needed. Higher currents lead to higher motor heat dissipation causing larger thermal expansion of the platen thereby producing larger position errors of the motor.

This type of linear motor is commonly referred to as a "forcer". The forcer is comprised of pairs of linear motors that are combined to provide two axes of motion (x-y) in mutually perpendicular directions. The forcer is moved across a flat platen electromagnetically. The forcer can be actuated in the x or y direction separately or in a vectorial combined direction. However, the forcer can only be rotated about the z axis through small angles.

One and two dimensional linear stepping motor systems (forcers) generally operate in an open loop fashion. Currents are sent through the motor windings with two, three or four phases and are generally advanced-through computer control by "micro-stepping" with either linear or pulse-width modulated (PWM) drives. This permits the motor to reach positions which are multiples of very small fractions of the motor's natural period based on teeth spacing. To insure that no steps are missed, generally only two-thirds to three-fourths of the available force is used. However, this mode of operation reduces the motor's potential maximum acceleration and velocity performance, makes it susceptible to loss of synchrony (missing steps), has a longer than desirable settling time after moving, and requires high power dissipation when holding a position to obtain acceptable stiffness.

There are several known techniques that can be used to measure position in a one or two dimensional linear motor system including those that can rotate. Such techniques include laser interferometry, tracking from light sources attached to the motor, optical sensing of teeth in the platen, capacitive sensing of the teeth and magnetic sensing of the teeth. With regard to the latter, for example, U.S. Pat. No. 3,735,231 discloses an inductive sensor which can be integrated with a Sawyer motor. One embodiment of the sensor in U.S. Pat. No. 3,735,231 includes a four pole magnetic member having a pair of sense windings which can be in the form of a printed circuit board disposed on non-adjacent poles at the exposed ends of the poles. The pair of windings provide outputs which are a periodic function of the head relative to the platen along one axis.

In another embodiment of the sensor disclosed in U.S. Pat. No. 3,735,231, the sensor comprises two inverted u-shaped ferromagnetic members disposed in a parallel and spaced relationship to each other by a magnetic cross bar. A drive winding is disposed on the cross-bar and a sense winding is wrapped around each of the four poles of the sensor. When the drive winding is energized with a periodic signal the two sense coils of each inverted u-shaped member produce a periodic voltage as the sensor is moved along a single axis. The output from each inverted u-shaped member is in phase quadrature and can be used to determine the displacement of the motor head relative to the platen along a single axis. A similar arrangement can be used to indicate displacement along an axis perpendicular to the single axis.

Another magnetic sensor for 2-D linear stepping motors is disclosed in Brennemann et al., "Magnetic Sensor for 2-D Linear Stepper Motor", IBM Technical Disclosure Bulletin, Vol. 35, No. 1B (June 1992). This sensor is an ac magnetic sensor based on self inductance of coils integrated with a sawyer motor. The sensor includes four linearly arranged poles, each having a plurality of teeth. Two poles on the left are separated from the two poles on the right by a magnetic spacer. A sense coil ($L_1 - L_4$) is wound around each of the poles. The sensor for each axis consists of eight coils wound on eight poles. Four poles are positioned in one quadrant of the forcer and four are positioned in the diagonally opposite quadrant. The inductance of a first sense coil L1 is at a maximum when the inductance of an adjacent sense coil L2 is at a minimum and vice-versa. The sense coils L3 and L4 are in phase quadrature with the coils L1 and L2. Each four pole sensor produces quadrature related output voltages which vary sinusoidally with motor displacement along one axis of the platen. The sensors can be used to measure displacement along one of two axes and rotation about the z axis. However, the above two sensors are relatively complex to make and use, expensive to manufacture, difficult to shield from unwanted external fields and have a relatively small signal.

U.S. Pat. No. 3,857,078 discloses a closed loop Sawyer motor system using magnetic position sensing. For detection along each axis, two pickoff assemblies are utilized. Each pickoff includes two magnetic cores joined by a magnetic cross piece having a drive coil wrapped around it. Each magnetic core has two poles, each with three teeth. The two poles of one core are spaced in a phase quadrature relationship with the two poles of the other core. The flux in each core varies with the linear positioning of the pickoff relative to the platen and the fluxes in the two cores are in a quadrature relationship with each other. A sense coil is wound around an upper horizontal portion of each core member. The two sense coils provide quadrature related output signals having periodic relationships in accordance with the actual displacement of the head along the platen. However, this sensor suffers from the disadvantage that since the magnetic path is not symmetrical on both sides of the drive coil the outputs have a large common mode (bias field) component which is not canceled.

U.S. Pat. No. 4,737,698 discloses an inductive sensor with coupled planar drive and sense windings in conjunction with a moveable electrically conductive screen whose position is determined by the degree of coupling between sense and drive. The conductive screen varies the coupling between drive and sense windings by the principle of eddy current shielding. When the drive winding is excited a voltage induced in the sense winding provides a signal indicative of the screen position. However, the sensor does not measure displacement of a coil structure with respect to a toothed magnetic structure. Moreover, the presence of the conducting screen decreases the coupling between drive and sense windings. In addition, the sensor has air-core coils.

Zeevi and Ish-Shalom, IEEE Tran. on BME, pp. 511-522, July 1982 describes an eye movement measurement device having one coil drive and two sense coils that reduce the effects of stray fields on measurement and simplifies the measurement method, because no bridge is required.

Thus, there is a need to develop a position sensor that can sense a position of a linear motor in the plane (x, y and rotation) that provides accurate position sensing during closed and open loop operation, eliminates any common mode pick up, is simple, low cost, can be integrated with a sawyer motor and can operate with multiple motors on one platen.

SUMMARY OF THE INVENTION

The present invention is directed to sensors for sensing the position of a linear motor relative to a platen. In one embodiment of the present invention, the sensor comprises two E-shaped magnetic members which are disposed above and contiguous with the platen. Each member includes a central tooth having a width equal to the pitch of the platen and two outer teeth having a width equal to the platen tooth width. The center tooth is spaced from the outer teeth by grooves having a width equal to the platen groove width. The spacing between centerlines of the outer teeth of each member is $2\frac{1}{2}$ P where P is the platen period. Each of the members are spaced by $p(n\pm\frac{1}{4})$ where n is any whole number.

A single turn planar drive winding is wrapped around the center tooth of each sensor. A single turn planar sense winding is wound around the outermost teeth of each sensor member. The sense coils are wound in opposite senses and are connected in series to provide a periodic output symmetric about zero.

The sensors can be used to sense the position of a linear motor relative to the platen due to the varying reluctance between the teeth of each sensor and the teeth of the platen and thus the flux therebetween varying as a function of the linear positioning of the sensor teeth relative to the platen. When a drive flux is applied, the sensor will produce a voltage output which is a smoothly varying function (centered on zero) of the position of the sensor relative to the platen with a period equal to the period of the platen teeth. To provide a quadrature output signal, which is highly desirable for tracking direction of motion and absolute position, a second sensor is spaced $(n+\frac{1}{4})$ platen periods from the first sensor.

In another embodiment of the present invention, each sensor comprises two identical magnetic members each having two teeth. One tooth can have a width equal to the platen period while the other tooth has a width equal to the platen tooth width. The two teeth are spaced by a groove equal to the width of a platen tooth. Alternatively, each of the two teeth can have a width equal to the platen tooth width and spaced by a groove equal to the platen tooth.

A single turn planar drive coil and a single turn planar sense coil are wound around each of the smaller teeth on each member. The drive and sense coils are spaced from each other by an insulator. The drive coils can be connected in series while the sense coils are wound in opposite electrical senses and connected in series. The two magnetic members are spaced by $p(n+\frac{1}{2})$ such that when each member is excited by a drive flux from the drive coils, the sense output signal from the first member will be at a maximum when the sense output from the second member is at a minimum and vice-versa. Thus, the resultant output of the sensor will be a smoothly varying function of the position of the sensor relative to the platen and centered at zero with a period equal to the platen period. The sensor can be replicated at a location of $p(n+\frac{1}{4})$ spaced from the first sensor to provide a quadrature output signal.

In yet a further embodiment of the present invention, the sensor includes first and second sensor elements which are identical. Each sensor element includes two teeth each having a width equal to the platen tooth width and separated by a groove of the same width. One of the teeth on each sensor element includes three regions, two outer regions spaced from a middle region by two grooves. The length of the middle region is preferably an integral number of platen periods. Three contiguous caps cover the three regions and the two grooves and form a continuous tooth surface having a width equal to the platen tooth width.

A single turn planar sense winding is wound around the center region and through the grooves of the second tooth of each sensor element. A single turn planar drive winding is wound around and encloses all three regions of the second tooth. The drive coils of each sensor element can be connected in series while the sense coils are wound in opposite senses and connected in series. The surface of the drive and sense coils is disposed parallel to the platen surface and the surface of the teeth of each sensor element.

The two sensor elements are spaced from each other such that when the tooth of one sensor element is aligned with a platen tooth, the corresponding tooth on the second sensor element is aligned with a platen groove. When each element is excited by a drive flux the output from the sense coil of one element will be at a maximum when the output from the sense coil of the other member is at a minimum and vice-versa. The resultant output of the sensor is a smoothly varying function of the position of the sensor relative to the platen. As in the above embodiments, the sensor can be replicated at a location of p(n+¼) to provide a quadrature output signal.

The sensors of the present invention provide several advantages. The small size and essentially planar form of the sensors are essential for minimizing volume and moving mass of an integrated motor/sensor, and allows operation at high frequencies. The single turn planar drive and sense coils can be easily fabricated in printed circuit form and assembled with the magnetic portion in a single operation. Signals from common mode fields are eliminated. All of the above advantages lead to a low cost sensor which is amenable to batch fabrication.

In yet a further embodiment of a sensor according to the present invention, the sensor includes two identical magnetic members each having a magnetic frame and four pole pieces. The bottom face of each of the pole pieces have a plurality of teeth of the same width and spacing as the teeth and grooves in the platen. The teeth on adjacent pole pieces are spaced such that when the tooth of one pole piece is over a platen tooth, a corresponding tooth on an adjacent pole piece is over a platen groove. The sensor members are spaced such that the centerlines of corresponding teeth on corresponding poles are spaced by p(n±¼).

Each member includes a single multiple turn drive winding and a single multiple turn sense winding. The drive winding is disposed around a horizontal bar of the frame while the sense winding is wound around the two centermost poles. When the sensor members are excited by a drive signal two magnetic flux paths are produced in each member. A first path comprises the first and third poles while a second path comprises the second and fourth poles. Thus, the sensor members measure the net flux passing through the two centermost poles which changes as a periodic function of the relative position of the sensor relative to the platen. The reluctance between the teeth of the pole pieces of each sensor and the teeth of the plate and thus the flux therebetween varies as a function of the linear positioning of the sensor pole pieces relative to the platen. The flux in each of the sensors will vary in accordance with the linear positioning of the sensor. The sensor elements produce outputs which are a periodic function of the position of the sensor relative to the platen. Since the sensor elements are spaced by p(n±¼), the outputs are in phase quadrature.

As a result of the symmetrical flux paths any spurious fields (bias) will be cancelled out. In addition, since each of the poles of each sensor element includes a plurality of teeth, the sensor measures position over multiple pitches of the platen providing a reliable indication of position. The total drive coil flux through the two poles on each side of the drive coil is identical due to the symmetry of each sensor member. As a result, the drive coil flux is independent of the position of the sensors.

Two pairs of the sensors can be used to measure displacement along two axes. In addition, the sensors of all these embodiments can be used to measure motor rotation in the plane and motor fly height above the platen. The sensor provides several advantages including a simple, low cost sensor that can operate with multiple motors on one platen. The sensor can sense coarse motor phase to detect loss of motor synchrony and allow for its correction. In addition, accurate motor phase can be sensed to achieve good electronic motor commutation and detect and correct motor loss of rotational synchrony.

Any of the above sensors can be integrated with a linear motor. The sensors are contained in each of the four quadrants of the motor and the teeth of the sensor can be aligned with the teeth on the motor to provide an accurate indication of the position of the motor with respect to the platen.

DETAILED DESCRIPTION OF THE INVENTION

Figure 1:
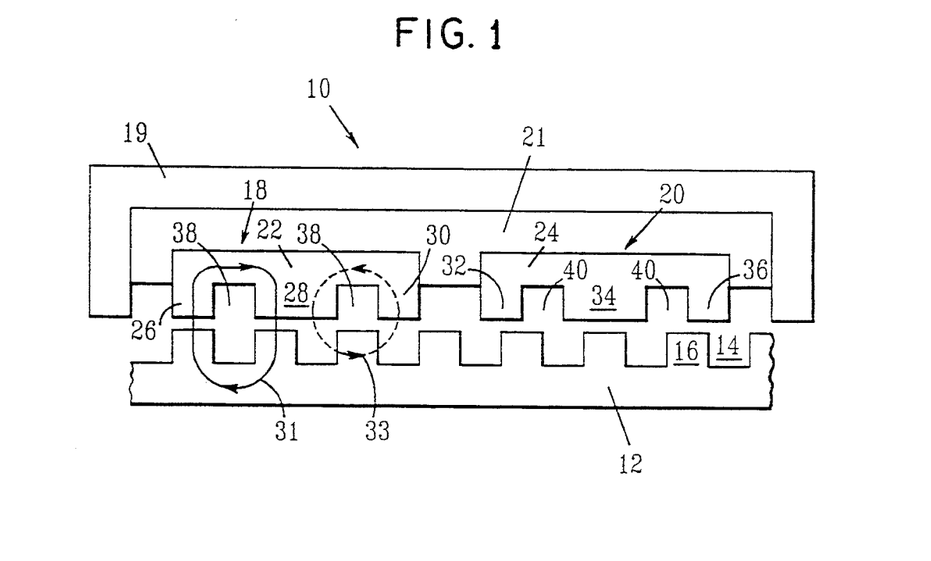
FIG. 1 is a schematic view of a sensor in accordance with one embodiment of the present invention.
Figure 2:
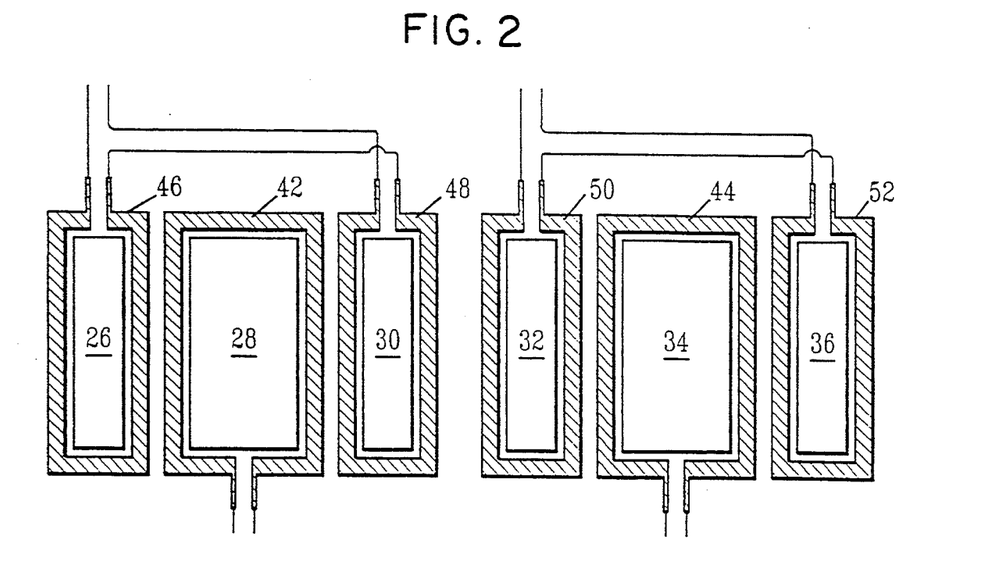
FIG. 2 is a bottom view of the sensor of FIG. 1, showing the arrangement of drive and sense windings.

Referring to FIGS. 1–2 there is shown a cross-sectional view of one embodiment of a sensor system 10 of the present invention. The system 10 includes a platen 12 which may be made from a ferromagnetic material such as iron. The platen 12 is provided with a plurality of parallel grooves 14 at spaced positions to define a plurality of magnetic teeth 16. The plurality of teeth 16 are equally spaced along two perpendicular axes, typically defined as the x-axis and y-axis. In effect, the grooves 14 and teeth 16 define a grid structure having an orthogonal matrix of teeth 16. The grooves 14 may be left open with the air serving as a non-magnetic material but it is preferred to fill the grooves 14 with a plastic or other non-magnetic material to provide a smooth upper surface for the platen 12. As an example of a typical platen structure, the grooves 14 can be 0.020 inches wide and 0.010 inches deep and are spaced 0.040 inches apart between centerlines.

This embodiment of the present invention includes two E-shaped magnetic structures 18 and 20 which are disposed above and in a contiguous relationship with the platen 12. The sensors 18, 20 can be used to sense the displacement of a linear motor (not shown) relative to the platen 12 along a single axis. Each of sensors 18, 20 includes a magnetic structure 22, 24 respectively and three teeth 26, 28, 30 and 32, 34, 36 respectively. The magnetic structures 22 and 24 can be comprised of a magnetic material such as manganese zinc ferrite. Each member 22, 24 includes a central tooth 28, 34 respectively having a width equal to the spatial period or pitch p of the platen 12, and two sense teeth 26, 30 and 32, 36 respectively having a width equal to the platen tooth width. The center tooth of each member 18, 20 is spaced from the two outer teeth by grooves 38 and 40 respectively having a width also equal to the platen tooth or groove width.

The outer teeth 26 and 30 of sensor 18 are spaced such that when one tooth (e.g., tooth 26 in FIG. 1) is over a tooth 16 of the platen, the other tooth (e.g., tooth 30) is over a groove 14 of non-magnetic material. In other words, the spacing between centerlines of outer teeth 26, 30 (or 32 arid 36) is $2\frac{1}{2} \times$ P. The member 24 is constructed identical to member 22. The members 22 and 24 are spaced such that when the tooth 26 is directly over a tooth 16 on the platen, the corresponding tooth on the other member (e.g., tooth 32) is midway between a tooth 16 and a groove 14. Thus, the centerline of corresponding teeth on sensors 22 and 24 are spaced by $P(n \pm \frac{1}{4})$ where n is any whole number.

Referring to FIG. 2, a single turn planar drive winding 42, 44 is wrapped around the center tooth 28, 34 respectively of each sensor member. A single turn planar sense winding 46, 48 and 50, 52 is wound around the outermost teeth 26, 30 and 32, 36 respectively of each sensor member. The sense coils 46, 48 and 50, 52 are wound in opposite senses and are connected in series to provide a periodic output as described below. This connection allows the sense winding outputs to be subtracted from one another and cancels signals from common mode external fields. In addition, connections to the drive and sense windings of each sensor are disposed on opposite sides of each sensor member to minimize direct coupling effects. The drive coils 42, 44 and the sense coils 46, 48, 50 and 52 define a plane substantially parallel to a surface of platen 12.

The sensor 10 further includes a shield 19 which covers the sensor 10 and extends down to the same height of the teeth 26, 28, 30, 32, 34, 36 to provide shielding from external motor fields in the air and to provide a parallel flux path for motor fields in the platen. A substrate 21 is disposed between the shield and the members 22 and 24.

The drive coils 42 and 44 provide a source of ac magnetic flux with substantial coupling to platen 12 that varies as a function of the position of the members 22 and 24. The pair of sensors 22 and 24 can be used to sense the position of a linear motor relative to the platen due to the reluctance between the teeth of each sensor and the teeth of the platen and thus the flux therebetween varying as a function of the linear positioning of the sensor teeth relative to the platen.

Figure 3:
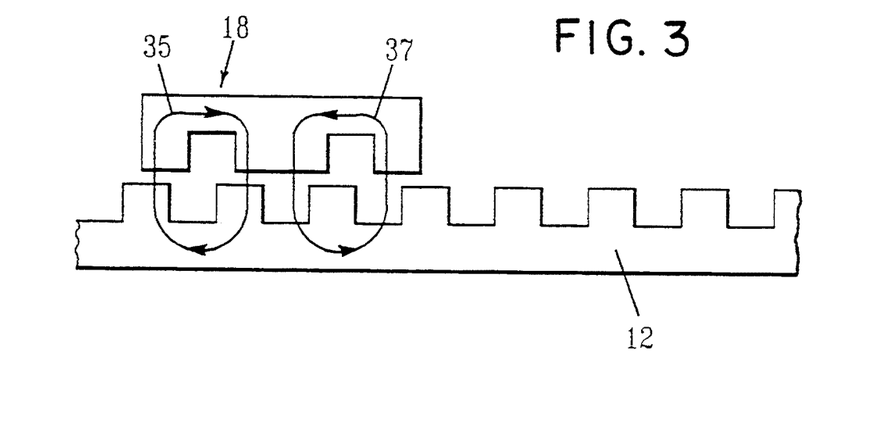
FIG. 3 is a simplified schematic view of one of the sensor members of FIG. 1 moved one-quarter of a platen period to the right.
Figure 4:
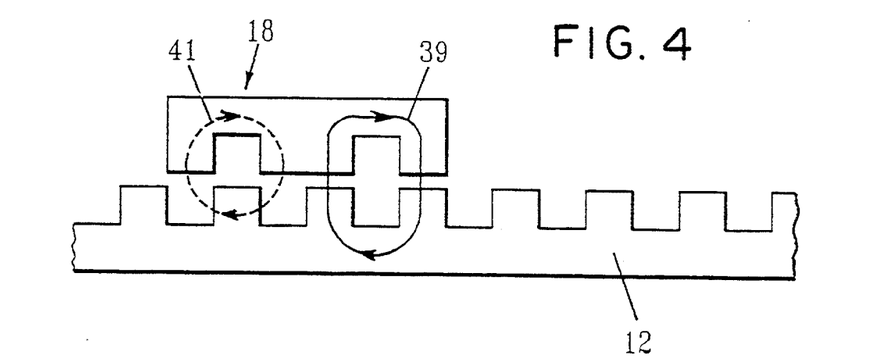
FIG. 4 is a schematic view of the sensor member of FIG. 3 moved another quarter of a platen period to the right.

Referring to FIGS. 1, 3 and 4 there is shown sensor 18 with a drive flux applied. When sensor 22 is in the position shown in FIG. 1, i.e., tooth 26 aligned with tooth 16 and tooth 30 aligned with a groove on the platen, most of the drive flux is coupled through the left sense tooth 26 as shown by flux 31 which induces an ac voltage in the left single turn planar sense coil 46. A smaller leakage flux 33 is induced in the right sense coil 48. As the sensor is moved to the right by $\frac{1}{2}$ tooth width as shown in FIG. 3, a symmetrical flux coupling is produced. More specifically, an equal flux 35, 37 is produced in each of teeth 26 and 30 thereby inducing equal voltages in sense coils 46 and 48. Since the sense coils 46 and 48 are wound in opposite senses and connected in series, the output of sensor 18 in the position shown in FIG. 3 is zero. As the sensor 18 is moved further to the right by another $\frac{1}{2}$ tooth width as shown in FIG. 4 (displaced by a full tooth width in relation to FIG. 1) most of the drive flux is coupled through the right sense tooth 30 since it is aligned with the tooth 16 on the platen. This results in a large flux 39 induced in the tooth 30 and a small leakage flux 41 induced in the left tooth 26. Accordingly, a larger voltage is induced in the right sense coil 48 than is induced in the left coil 46.

As a result of the coil connections, the output of sensor 22 will be a smoothly varying periodic function (centered on zero) of the position of the sensor 22 relative to the platen 12 with a period equal to the period of the platen teeth 16. To provide a quadrature output signal, which is highly desirable for tracking direction of motion and absolute position, the second sensor 24 is spaced $n+\frac{1}{4}$ platen periods from the first sensor 22. Quadrature detection of motion is standard practice for incremental motion sensors and can be carried out by many well-known integrated circuits. The outputs of each sensor is quasi-sinusoidal.

As an illustrative example of the dimensions and materials which can be used for sensors 18 and 20, each member 22, 24 can be made from manganese zinc ferrite. The sense teeth 26, 30 and 32, 36 can be 0.020 inches wide while the drive teeth 28 and 34 can have a width of 0.040 inches. The grooves between the drive teeth and adjacent sense teeth can be 0.020 inches wide. The first member 22 can be spaced from the second member by 0.030 inches to create a quadrature phase relationship between their outputs and to provide some degree of isolation between the two members 22, 24. The length of each tooth is 0.600 inches. The substrate 19 can be a glass-ceramic substrate which is machined to hold members 22 and 24. The shield can be made of $\mu$-metal. The coil for the sense and drive windings can be made from copper.

Figure 5:
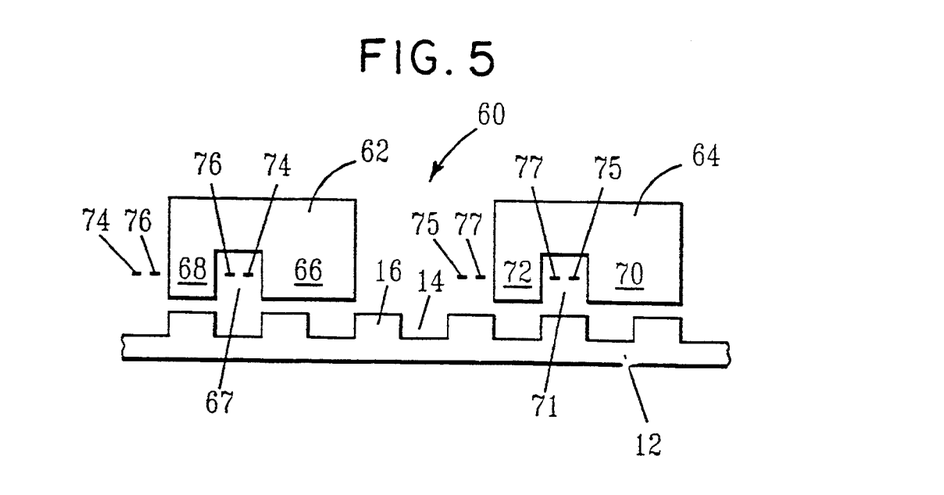
FIG. 5 is a schematic view of a sensor in accordance with another embodiment of the present invention.
Figure 6:
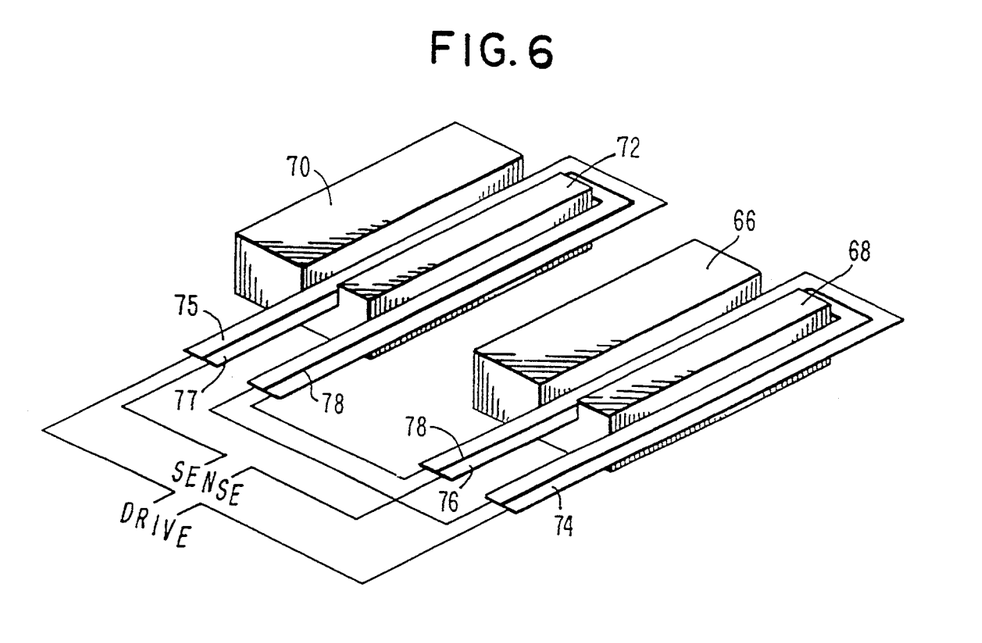
FIG. 6 is a perspective view of the sensor of FIG. 5.
Figure 7:
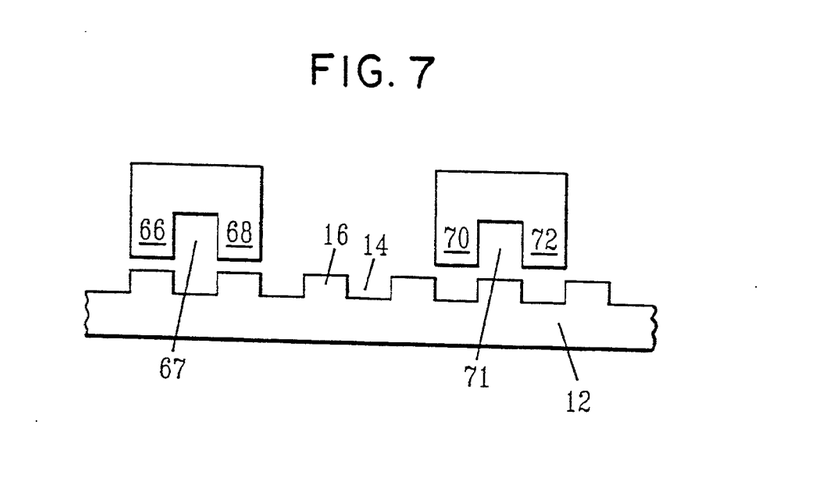
FIG. 7 is a schematic view of a sensor in accordance with a further embodiment of the present invention.

Referring now to FIGS. 5 and 6, there is shown another embodiment of a sensor 60 of the present invention. In this embodiment, each sensor 60 comprises two identical sensor elements 62 and 64 which are made of a magnetic material. Each member includes two teeth 66, 68 and 70, 72 respectively. The teeth 66 and 70 have a width equal to the period of the platen 12 while the teeth 68 and 72 have a width equal to the platen tooth width. The teeth 66, 68 and 70, 72 are spaced by a groove 67, 71 respectively, equal to the width of a platen tooth. Although the tooth 66 and 70 of members 62 and 64 respectively are shown in FIGS. 5 and 6 to be equal to the platen period this is not required. Alternatively, the teeth 66 and 70 can be equal to the platen tooth width but spaced from teeth 68 and 72 respectively by a groove 67, 71, respectively equal to the platen tooth width as shown in FIG. 7.

Referring to FIG. 6, a single turn planar drive coil 74 and 75 is wound around teeth 68 and 72 respectively. A single turn planar sense coil 76 and 77 is also wound around teeth 68 and 72 respectively. The drive coils 74 and 75 are connected in series while the sense coils 76 and 77 are connected in a series opposite manner. Drive coil 74 and sense coil 76 are separated by an insulator 78. Similarly, drive coil 75 and sense coil 77 are also separated from each other by an insulator. The drive coils 74, 75 and sense coils 76, 77 define a plane substantially parallel to a surface of platen 12. As a result of this coil configuration, the teeth 66 and 70 provide a part of the return flux path for the flux emerging from the drive/sense teeth 68 and 72.

The magnetic members 62 and 64 are spaced by $p(n+\frac{1}{2})$. In other words, when the tooth 68 of member 62 is aligned with a platen groove 14, the tooth 72 of member 64 will be aligned with a platen tooth 16. Thus, when each member is excited by a drive flux from drive coils 74, 75 the sense output signal from the first member 62 will be at a maximum when the sense output signal from the second member 64 is at a minimum, and vice versa. By connecting the drive coils 74, 75 in series and the sense coils 76, 77 in a series opposite fashion (or vice versa), the resultant output of sensor 60 will be a smoothly varying function of the position of the sensor relative to the platen and centered at zero with a period equal to the period of the platen. Thus, as in the preceding embodiment, the sensor 60 provides an output which is a periodic function of the sensor 60 relative to platen 12. The periodic function can similarly be represented by a Fourier series. Similarly, the sensor 60 can be replicated at a location of $p(n+\frac{1}{4})$ spaced from the sensor 60 to provide a quadrature output signal.

Figure 8:
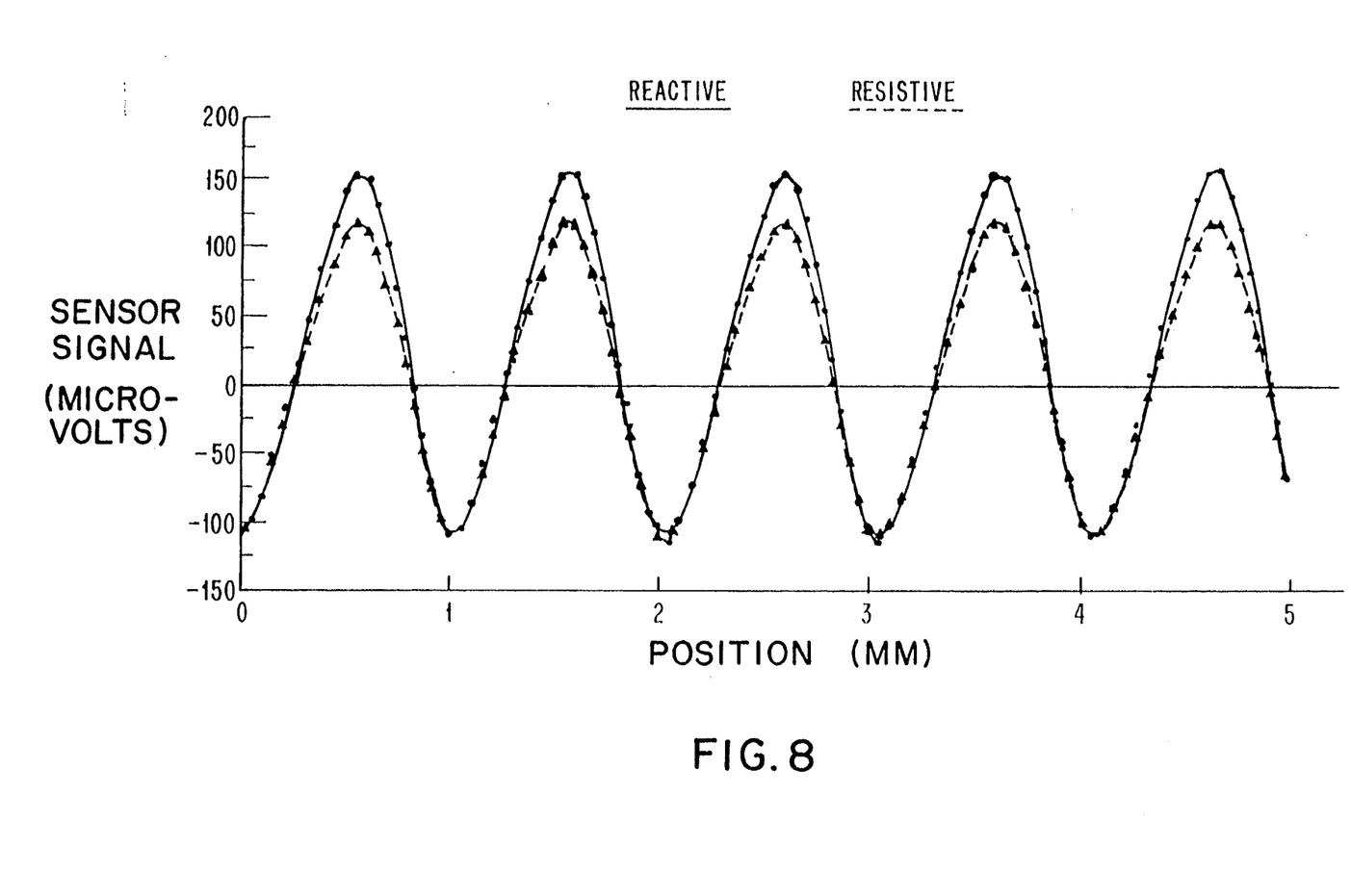
FIG. 8 is a graph of the output of the sensor in FIG. 5 versus its position along the platen.

As an illustrative example, FIG. 8 shows the output voltage of sensor 60 versus position by translating the sensor across the platen with an x-y stage. The drive/sense teeth 68, 72 had a width of 0.020 inches and the return path teeth 66, 70 had a width of 0.040 inches. The total sensor width was 0.2 inches. The drive coil was excited with 65 milliamps rms at 100 kHz and the sense voltage was detected with a lock-in amplifier. A gap of 1.5 mils between the sensor 60 and the platen 12 was maintained using a shim. The signal from the sensor 60 has significant components both in phase (resistive) and out-of-phase (reactive) with the drive current. The size of the signal compares very favorably with the intrinsic noise for sensor 60. A suitable type of preamplifier for such a sensor is that used in disk files. The preamplifiers have a noise level of about 0.2 microvolts rms in a 10 KHz bandwidth giving a signal to noise ratio of 500:1. The resistance of-sensor 60 is extremely small (0.2 ohms) giving it an intrinsic noise level about 10 times smaller than the preamplifier.

An important feature of each of the above described embodiments of the present invention is that they are sensitive to translation along one axis only thereby providing a more accurate indication of the position of the sensor relative to the platen. When the sensor is moved in a direction orthogonal to a measurement direction, only weak modulation occurs due to fringing effects. This results from the platen teeth which form a rectangular grid pattern along both the x and y axes which leads to a small modulation of the output signals in the non-measurement direction.

Figure 9:
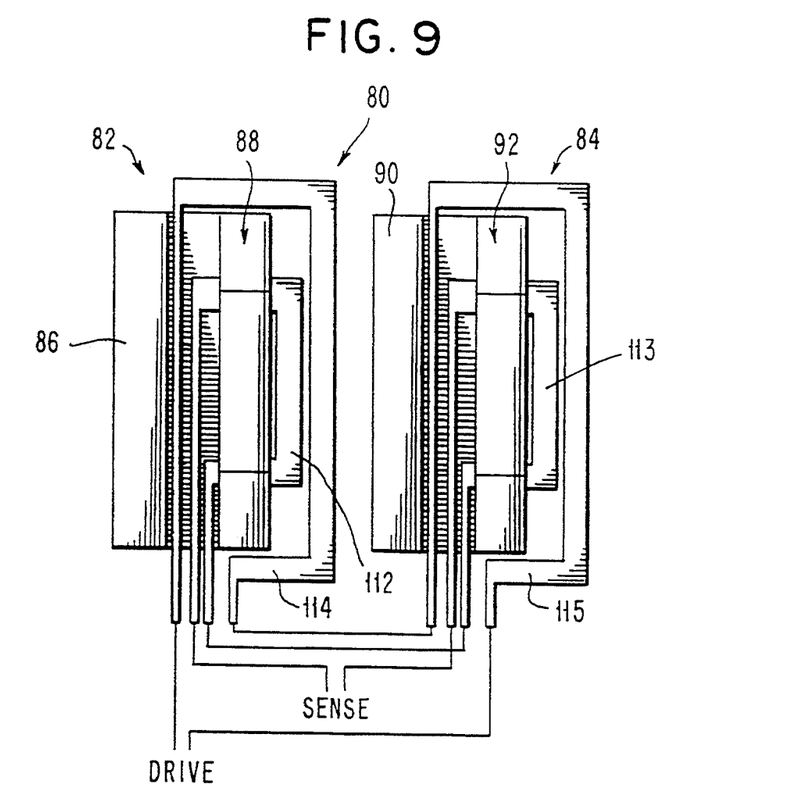
FIG. 9 is a top view of a sensor in accordance with another embodiment of the present invention.
Figure 10:
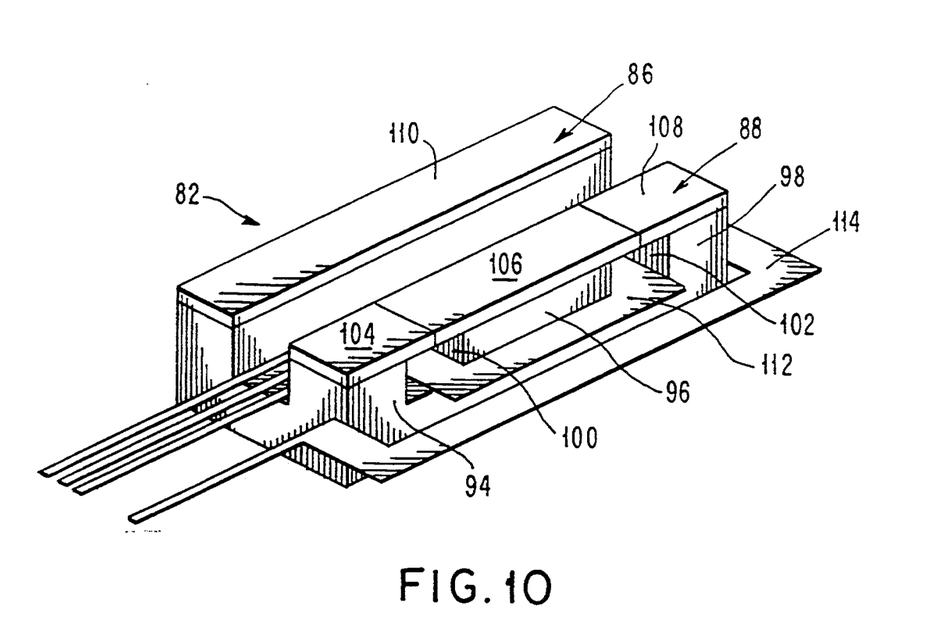
FIG. 10 is a perspective view of one of the sensor members of FIG. 9.

Turning to FIGS. 9 and 10, there is shown another embodiment of a sensor 80 of the present invention. In this embodiment, each sensor 80 includes two identical sensor elements 82 and 84. Each member includes two teeth 86, 88 and 90, 92 respectively. Each of the four teeth have a width equal to the platen tooth width. The teeth 86, 88 and 90, 92 are spaced by a groove equal to the platen tooth width.

The teeth 88 and 92 are comprised of three regions 94, 96 and 98. The two outer regions 94 and 98 are spaced from the middle region 96 by grooves 100 and 102. Three caps 104, 106 and 108 cover each of regions 94, 96 and 98 respectively and the grooves 100 and 102 and form a nearly continuous tooth surface. The gaps between cap sections are smaller than the grooves 100 and 102 but still large enough that the three regions act largely independently with regard to flux transmission. The length of middle cap 106 is preferably an integral number of platen periods in length. The length of the outer caps 104 and 108 can vary and should equal or exceed the width of tooth 88. A single magnetic cap 110 covers the teeth 86 and 90 respectively. The caps can be made from the same magnetic material as the members 82 and 84 and can be adhered to the respective teeth by a suitable epoxy.

A single turn planar sense winding 112 and 113 is wound around the center region 96 of each of teeth 88 and 92 respectively. The sense coils 112, 113 fit within the grooves 100 and 102. A single turn planar drive winding 114 and 115 is wound around and encloses all three regions of teeth 88 and 92 respectively. The drive coils 114,115 are connected in series while the sense coils 112 and 113 are wound in opposite senses and connected in series. The surface of the drive and sense coils 114, 115 and 112, 113 is disposed parallel to the platen surface and the surface of the teeth 86, 88 and 90, 92 respectively.

The sensors 82 and 84 are spaced from each other by $p(n+\frac{1}{2})$. In other words, when the tooth 86 of member 82 is aligned with a platen tooth, the corresponding tooth 90 of member 84 will be aligned with a platen groove. Thus, when each member 82, 84 is excited by a drive flux from drive coil 114, 115 the output from the sense coil 112 of the member 82 will be at a maximum when the output from sense coil 113 of member 84 is at a minimum and vice-versa. By connecting the drive coils 114 and 115 in series and the sense coils 112 and 113 in a series opposite fashion the resultant output of sensor 80 will be a smoothly varying function of the position of the sensor 80 relative to the platen with a period equal to the platen period. The periodic function can be represented by a Fourier series. As in the previous embodiments, the sensor 80 can be replicated at a location of $p(n+\frac{1}{4})$ to provide a quadrature output signal. The sensor 80 provides significantly less signal modulation with transverse motion of the sensor.

Figure 11:
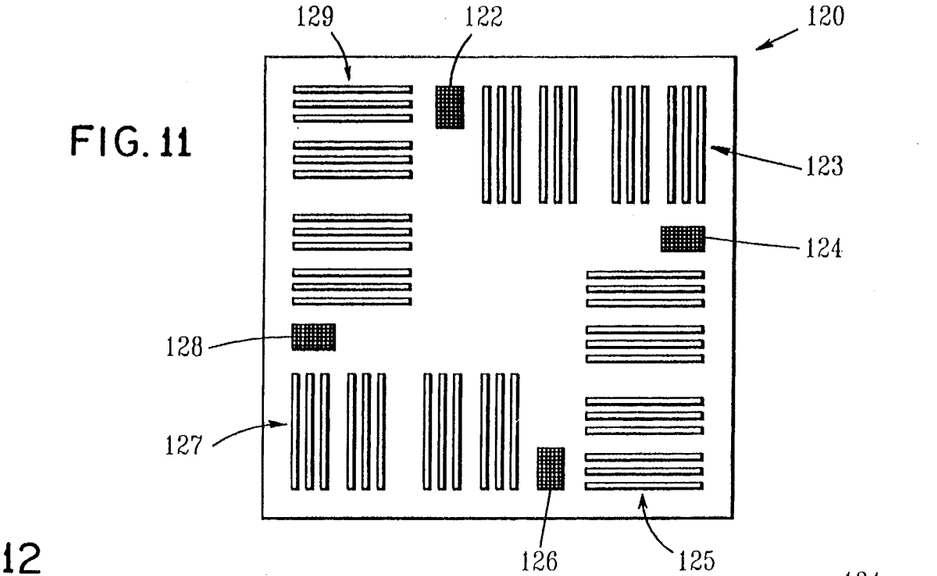
FIG. 11 is a plan view of a Sawyer linear motor incorporating sensors according to the present invention.

Referring to FIG. 11, there is shown a representative diagram of how four of the sensors 10, 60 or 80 can be arranged in a Sawyer motor forcer 120 to provide control of the motor in the x-y plane. The motor 120 comprises four quadrants with a sensor 122, 124, 126, 128 and an actuator 123, 125, 127, 129 respectively in each of the quadrants. For example, the two sensors 122 and 126 can be used to measure the position of the forcer in the x-direction while sensors 124 and 128 can be used to measure position in the y-direction.

The sensors 10, 60 and 80 provide several advantages. The size of the sensors are relatively small and its essentially planar form is very amenable to manufacture. The small size is essential for minimizing the volume and moving mass of an integrated motor/sensor. In addition, the small size allows operation at high frequencies (100 KHz or more). This is important in detection electronics since the carrier frequency is well separated from both the PWM frequency of the motor drives (several tens of KHz) and the periodic frequencies associated with high speed motion (several KHz).

The single turn planar drive and sense coils can easily be fabricated in printed circuit form and assembled with the magnetic portion in a single operation. For very small sensor/platen periods, the coils and the magnetic 1 structures can be fabricated in integrated form, for example by plating through masks. The sensor design is amenable to batch fabrication of hundreds of sensors per wafer in parallel, with later dicing into individual sensors. All of these advantages lead to a low cost sensor. By connecting the two sense coils in series opposition, common mode pick-up is eliminated. Due to the essentially planar geometry, the sensor of the present invention is much easier to shield from unwanted external fields.

Figure 12:
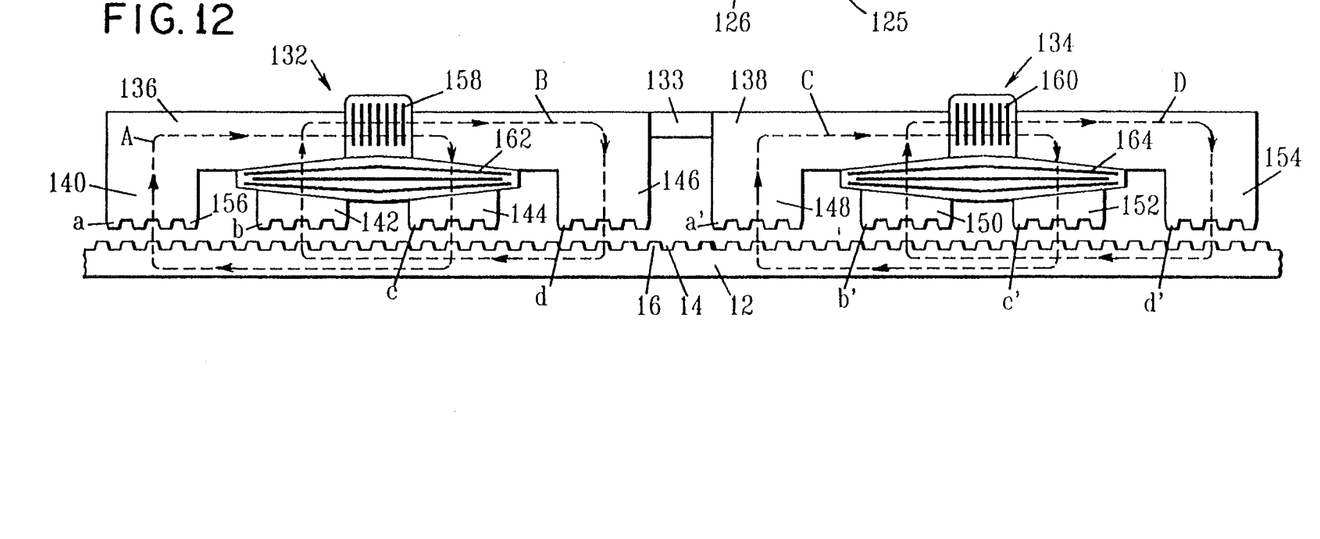
FIG. 12 is a schematic view of a sensor in accordance with a further embodiment of the present invention.

Referring to FIG. 12, there is shown a cross-sectional view of a further embodiment of a sensor system 120 of the present invention. As described above, the platen 12 includes a plurality of non-magnetic grooves 14 and a plurality of magnetic teeth 16 to define an orthogonal grid structure.

The system 130 includes a pair of movable sensors 132 and 134 disposed in a parallel spaced relationship with the platen and are used to sense the displacement of a linear motor (not shown) relative to the platen 12 along a single axis. Each of sensors 132 and 134 include a frame 136, 138 respectively and four pole pieces 140, 142, 144, 146 and 148, 150, 152 and 154 respectively. The frame and pole pieces are comprised of a magnetic material such as SiFe, ferrite or manganese zinc ferrite. The bottom face of each of the eight pole pieces have a plurality of teeth 156 of the same width and spacing as the teeth 16 and grooves 14 in the platen.

The first tooth a, b c and d of each of pole pieces 140, 142, 144 and 146 are spaced such that when the tooth of one pole (e.g., tooth a of pole 140) is over a tooth 16 of magnetic material on the platen 12, a corresponding tooth of any adjacent pole (e.g., tooth b of pole 142) is over a groove 14 of non-magnetic material on the platen 12. In other words, the spacing between centerlines of teeth a and b, b and c, or c and d may be $p(n \pm \frac{1}{2})$ where n is any whole number and p is the pitch of the grid on the platen 12 or the distance from a centerline of one groove or one tooth to the centerline of the next groove or tooth on the platen 12. The pole pieces 140 and 144 are spaced so that the magnetic teeth a and c are at teeth 16 at the same time. At the same time, pole pieces 142 and 146 are spaced so that the magnetic teeth b and d are at grooves 14 at the same time.

The sensor 134 is constructed identical to sensor 132. The sensors 132 and 134 are spaced by a non-ferromagnetic spacer 133 such that when the teeth of one pole (e.g., 140) on sensor 132 are directly over a tooth 16 or a groove 14, the teeth of a corresponding pole (e.g., 148) of sensor 134 are midway between a tooth 16 and a groove 14. Thus, the centerlines of corresponding teeth on corresponding poles of sensors 132 and 134 are spaced by $p(n \pm \frac{1}{4})$.

Sensors 132 and 134 include a single drive winding 158, 160 respectively and a single sense winding 162, 164 respectively. The drive windings 158 and 160 are wound around the frame of the respective sensor 132, 134 while the sense windings 162,164 are wound around the two center poles 142, 144 and 150, 152 respectively. When sensors 132 and 134 are excited by a drive signal from drive windings 158 and 160 respectively, two magnetic flux paths are produced in each sensor. These flux paths are symmetrical around the center of the drive coils. One flux path A comprises the poles 140 and 144 having teeth aligned with the platen teeth 16, and the platen 12. A second path B comprises poles 142 and 146 having misaligned teeth with the platen teeth 16, and the platen 12.

The reluctance between the teeth of the pole pieces of each sensor and the teeth of the platen and thus the flux therebetween varies as a function of the linear positioning of the sensor pole pieces relative to the platen. Thus, for example, pole pieces 140 and 144 in FIG. 12 are shown in a position of minimum reluctance relative to the teeth on the platen 12 so that a maximum flux A is produced in pole pieces 140 and 144 while pole pieces 142 and 146 are shown in a position of maximum reluctance relative to the platen so that a minimum flux B is produced in pole pieces 142 and 146. The pole pieces 148, 150, 152 and 154 are shown in FIG. 12 in a position providing for an intermediate production of flux. It thus can be seen that the flux in sensors 132 and 134 will vary in accordance with the linear positioning of the sensor, the fluxes in sensors 132 and 134 being in a quadrature relationship with each other. Thus in the position shown in FIG. 12, the net flux passing through sense winding 162 is downward. When the sensor 132 is moved $\frac{1}{4}$ of a pitch cycle to the right, the net flux through winding 162 is zero. If the sensor 132 is then moved another $\frac{1}{4}$ of a pitch cycle to the right, the net flux through sensor 132 is upward with the same magnitude as the first position. Thus, the sense coil 162 provides an output which is a periodic function of the position of sensor 18 relative to platen 12.

Figure 13:
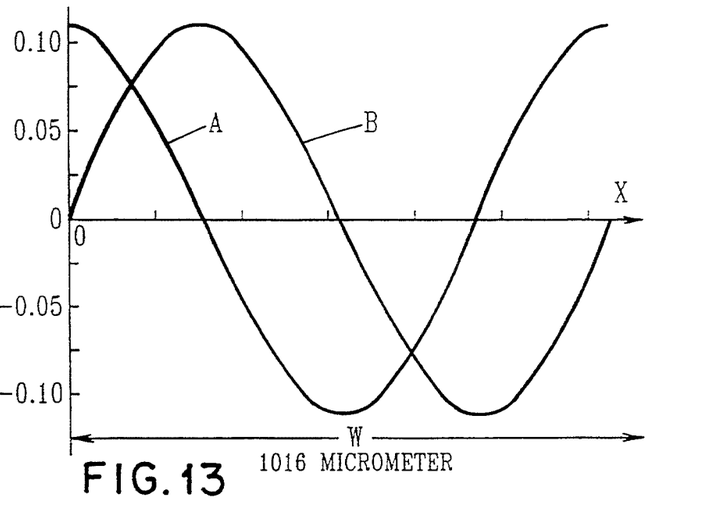
FIG. 13 is a graph of the ideal output of each of the sensor members in FIG. 12 versus its position along the platen.

The output of sense coil 162 can be approximated as $\beta \cos(2\pi x/p)$ where $\beta$ is the magnitude and x is the displacement of sensor 132. For each of the positions described for sensor 132, the sensor 134 will have an output which is quadrature related to the output of sensor 132. Thus, sense coil 164 will produce an output of $\beta \sin(2\pi x/p)$. The outputs of sensors 132 and 134 are shown as curves A and B respectively in FIG. 13. Quadrature detection of motion is standard practice for incremental motion sensors and can be carried out by many well known standard integrated circuits.

Due to the antisymmetry of the poles inside the winding of sense coils 162 and 164 the output of sensors 132 and 134 measure the flux difference between the two centermost poles of each sensor. In other words, the sensors measure the flux difference between teeth that are spaced $\frac{1}{2}$ tooth apart or $\frac{1}{2}$ pitch cycle apart. As a result, of the symmetrical flux paths any spurious fields (bias) will be canceled out and 100% modulation is obtained. The zero bias allows the sensors 132 and 134 of the present invention to obtain a very high dynamic range of position measurement. In addition, since each of the poles of each sensor includes multiple teeth, the sensors 132 and 134 measure position over multiple pitches of the platen providing a reliable indication of position.

The total drive coil flux through two poles on each side of the drive coil (e.g., poles 140, 142 and poles 144, 146) is identical due to the symmetry of the sensor 132. As a result, the drive coil flux is independent of the position of sensors 132, 134. However, the key feature is that the relative flux through the two center poles (e.g., 142 and 144) changes as a periodic function of the relative position of the sensor 132, 134 to the platen 12.

As an illustrative example, sensors 132 and 134 can be excited by a drive signal of magnitude $1+\alpha$ from left to right by drive windings 158 and 160. It should be noted that although the drive signal is an AC signal the sensor output is to the first order independent of the operating frequency of the drive signal. In the position shown in FIG. 12 for sensor 132, 1 passes through the poles 140 and 144 (flux path A) and $\alpha$ passes through poles 142 and 146 (flux path B). The term α is used to represent the amount of leakage through poles 142 and 146 for the position of sensor 132. For sensor 134, fluxes C and D are of equal magnitude and are $(1+\alpha)/2$. The value of α can be obtained by measuring the relative change of reluctance from the aligned poles 140 and 144 to the misaligned poles 142 and 146. By defining an upward flux through a pole as negative and a downward flux as positive, it can be seen that the normalized output B of the sense coil 162 is equal to the net flux through sense coil 162 $(1-\alpha)$ divided by the total flux $(1+\alpha)$. Thus, when the sense and drive coils 158 and 160 have equal number of turns then the sense coil normalized output, β is $$\pm \beta = \frac{1-\alpha}{1+\alpha}$$

given a drive coil voltage of 1 (assuming the frame 136 is not saturated and flux losses are negligible). In practice, we measured sensor outputs of ±0.11 and determined α to be 0.8. Thus, even with an equal number of windings in the drive and sense coils, the sensor output signals are very large, $\beta = 11\%$ of the input signal with 100% modulation and zero bias. To obtain a good signal to noise ratio, S/N, the frequency of the drive coil flux can be chosen to be away and/or out of phase with respect to other disturbing signals and fields such as the motor drive power signals and pulse width modulated (PWM) frequency.

Figure 15:
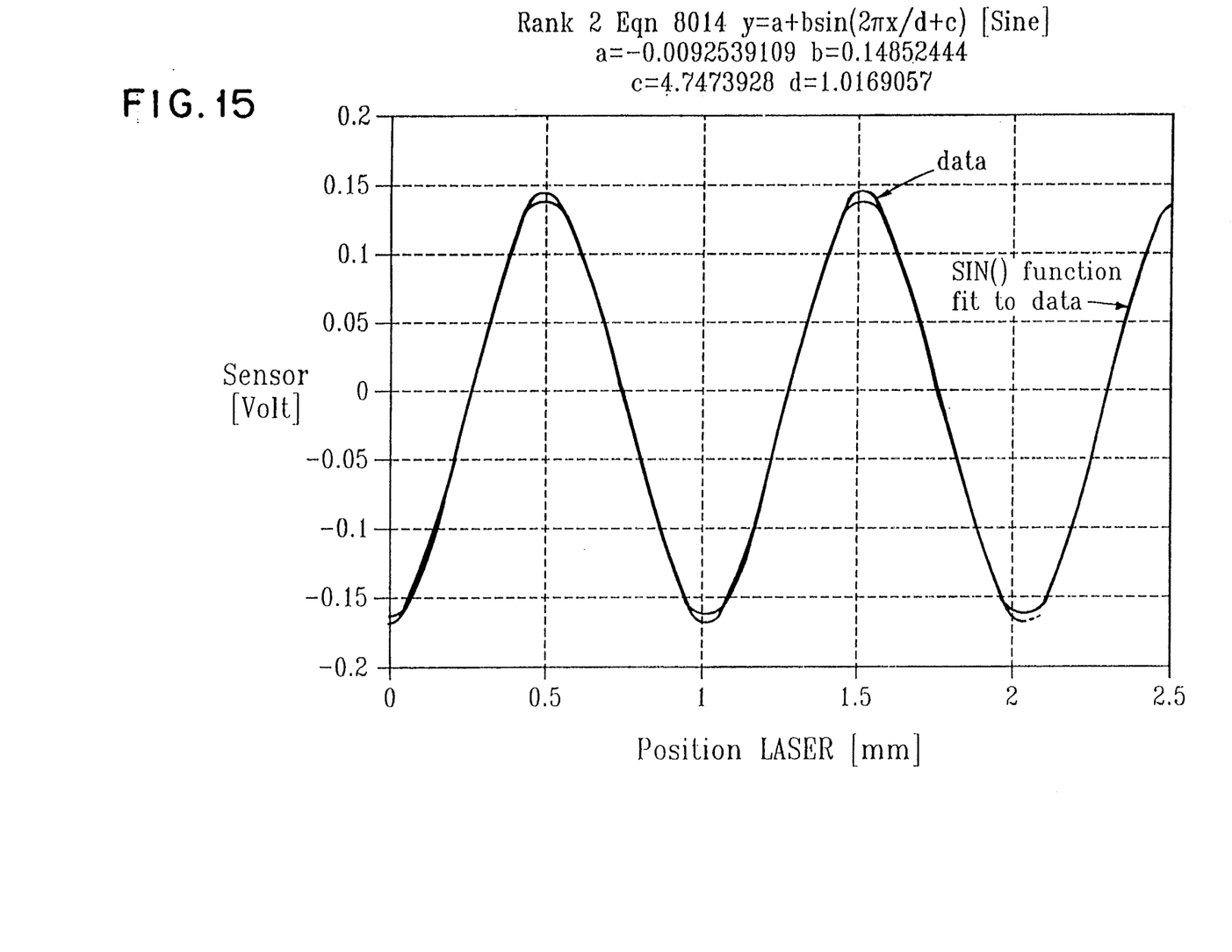
FIG. 15 is a graph showing the detected sensor output versus position of a sensor of the present invention.

The sensor of the present invention has only 2 coils and uses symmetry for detection of just the magnetic field changes resulting from sensor position changes. The sensor's symmetrical design cancels to first order any spurious fields that would be detected by the coils, which the literature cites as the major factor limiting resolution. Two sensors are needed to obtain a standard quadrature output signal. Even with an equal number windings in the excitation and pickup coils the sensor output signal should be very large, $\beta = 11\%$ of the input signal, with 100% modulation depth and zero bias. The zero bias allows one to obtain very high dynamic range of position measurement. The sensor is much simpler to use than prior art bridge arrangements, since, to the first order, the complex balancing of both the real and imaginary parts is not required. Furthermore, to the first order, the sensor operation is independent of operating frequency. The sensor measures directly the difference of the flux between the aligned and misaligned poles simplifying electronics and minimizing errors due to fabrication variations in coils and laminations. This is a serious drawback of the prior art techniques. A test sensor in accordance with the present invention was made from SiFe. As shown in FIG. 15, at a drive frequency of 1 kHz a very large output signal swing of ±0.15 Volt was obtained before any amplification with $n_s = 910$ and $n_1 = 162$ turns and drive voltage of just 0.4 Volt rms. This corresponds to a normalized output, β, of 4.4% compared to 11% expected by the simple theoretical calculation for $\alpha = 0.8$. The results show the good repeatability of the sensor output from one cycle to the next.

Thus, this embodiment of the present invention provides a transformer with a maximum transformation ratio β that depends on the sensor position relative to the platen 12. The output of sensors 132 and 134 can be easily detected by using a synchronous detector or lock-in amplifier both of which are well known in the art. There are integrated circuits that are available that include both a sine wave generator and a synchronous detector on a single chip. Synchronous detection can provide a very large dynamic range for the detected signal enabling very high resolution position measurement.

Since the outputs of sensors 132 and 134 are replicated at each platen period, there is a need to count cycles to determine the precise position of the sensor 120 relative to the platen 12. If one meter is 1,016 cycles (for a 1.016 mm platen pitch there are 4,064 quarter cycle counts. Within each quarter cycle the sensor analog voltage output can be measured and higher position resolution can be interpolated. For example, with a tooth pitch of 1.016 mm and even a low sensor output dynamic range of just 2,000:1 (which can be converted to an 11 bits number using a standard analog to digital converter), sensing resolution of better than 0.25 μm is obtained, i.e. 22 bit position resolution over a motion range of 1 meter.

Figure 14:
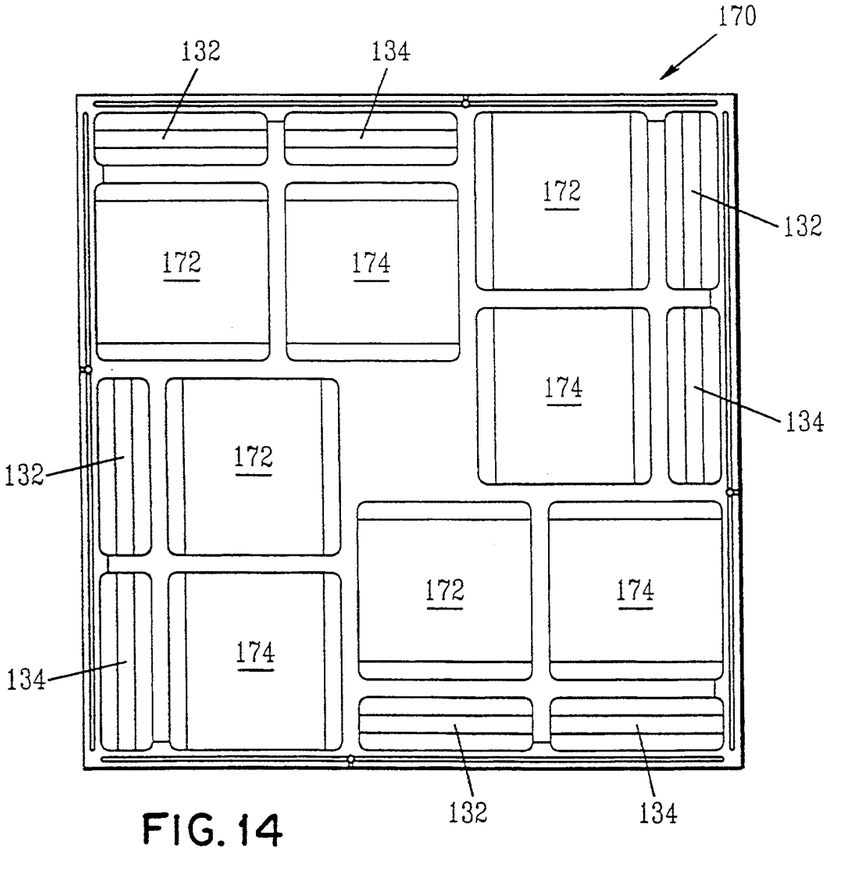
FIG. 14 is a plan view of a Sawyer motor incorporating the sensor of FIG. 12.

Referring to FIG. 14, there is shown a linear sawyer motor 170 incorporating the sensors of the present invention. The motor 170 includes four quadrants. Each quadrant contains a pair of actuators 172, 174 and a pair of sensors 132,134. The drive and sensing for each axis is provided by the pair of actuators and pair of sensors in diagonally opposite quadrants. The actuators 172,174 are conventional Sawyer motors which are well known in the art of the present invention and are thus only described briefly herein. There are four motor poles for each actuator 172, 174, with each pole containing a plurality of teeth that oppose the teeth in the platen 12. The motor actuators 172, 174 define the poles of a single two-phase four pole hybrid linear step motor of conventional design. Applying current to the series connected coils of one phase produces a magnetic field reinforcing the permanent magnetic flux at one pole and canceling it at the other, resulting in linear motion along one axis.

The teeth on the sensors 132,134 are aligned with and have the same size as the teeth on the actuators 172, 174 to provide position measurement of the motor. The sensors 132 and 134 can be made mechanically similar to the motor actuators 172, 174 except that the sensors are made of two identical members 132, 134 spaced apart by a non-ferromagnetic material 133 and an additional drive coil 158, 160 is wound around the horizontal portion of each sensor. The actuators 172, 174 include a magnet spacer and do not have a drive coil wound on the horizontal portion. The material for making the sensors could be different from the motor section to improve sensor performance. The improvement can be in the area of lower hysteresis in the sensor, lower eddy current losses and a more linear B-H material (to reduce nonlinear coupling from the motor field). These allow for higher frequency operation of the sensor of even 100 KHz. For example, ferrite can be used for the sensor without laminations and SiFe can be used for the actuators to provide these advantages.

Although the present invention was described with regard to one pair of sensors for single axis measurement, it should be understood that two pairs of sensors can be used to measure displacement of the motor along two axes. The sensors 132 and 134 of the present invention can also sense motor rotation in the plane from the difference between the linear position measurements of the sensors in diagonally opposite quadrants of motor 170. The sensors of the present invention can also be used to measure the motor fly height above the platen.

This can be done by applying a current to the drive coils 158, 160 and measuring the voltage output thereof. This can be done because the inductance of the drive coil changes as a linear function of the motor fly height. In addition, the reluctance path (inductance) that the drive coil sees is substantially a constant, independent of position. In addition, differential measurements of the fly height at several locations around the motor perimeter also gives a measure of the slight rotations of the motor around the x and y axes, in the plane. Thus, the sensors of the present invention can be used to measure all six degrees of freedom (dof) of the motor body.

The sensors 132 and 134 of the present invention provide several advantages including a simple sensor that can sense a linear motor's position in the plane (x,y and rotation), can operate with multiple motors on one platen is low cost and can be easily integrated with a Sawyer motor. The sensors can sense coarse motor phase to detect loss of motor synchrony and allow for its correction. In addition, accurate motor phase can be sensed to achieve good electronic motor commutation and detect and correct motor loss of rotational synchrony. The sensors of the present invention also sense position with (1) a high resolution for closed loop motor control and (2) with high accuracy to improve motor positioning accuracy by use of closed loop motor control to reject disturbances and motor inaccuracies. Moreover, the sensors can sense motor fly height which can be beneficial for better motor control.

The sensors of the present invention can be used in a wide variety of devices including planar x-y linear sawyer motors, six dof magnetic position sensing, two large dof motions x and y plus four other small dof motions, single axis linear step motors, two dof rotary linear step motors and three dof rotary step motors.

Having thus described the invention, what is claimed as new and what is desired to be secured by Letters Patent is:

1. A sensor for sensing a position of a linear motor relative to a platen comprising:
    a platen having first and second sets of parallel uniformly spaced grooves formed in a platen surface, said first set being oriented perpendicularly with respect to said second set, thereby defining an orthogonal matrix of teeth, a first magnetic member having teeth disposed adjacent to the teeth on the platen to move along an axis of motion parallel to one of said sets of grooves of the platen, said teeth being colinear with said axis of motion,
    a second magnetic member spaced from the first magnetic member and having teeth disposed adjacent to the teeth on the platen to move along said axis of motion relative to the platen, said teeth being colinear with said axis of motion,
    a single turn planar drive winding disposed around at least one of said teeth of each of said first and second magnetic members for producing a first and second drive flux within each of said members, and
    a single turn planar sense winding disposed around at least one of said teeth of each of said first and second magnetic members for generating signals which are periodic functions of position of the respective magnetic member with respect to the platen, selected pairs of said sense windings being connected in voltage differencing relation therein producing an output which is the difference of the signals of said selected pairs of sense windings.

2. The sensor according to claim 1, wherein each of said first and second magnetic members comprises a magnetic structure having first and second outer teeth and a center tooth, said center tooth being spaced from each of said outer teeth by a groove on each side of said center tooth such that said first and second fluxes encircle each of said grooves on each of said first and second members.

3. The sensor according to claim 2, wherein each of said outer teeth and each of said grooves have a width equal to a width of the teeth on the platen and said center tooth having a width equal to a spatial period, p, of the platen.

4. The sensor according to claim 3, wherein a single turn planar drive winding is wound around the center tooth of each of said first and second members, a single turn planar sense winding is wound around each of said outer teeth of each of said first and second members.

5. The sensor according to claim 4, wherein each of said planar drive and sense windings define a plane substantially parallel to a surface of said platen.

6. The sensor according to claim 4, wherein the single turn planar sense winding around one of the outer teeth is wound in an opposite electrical sense to the single turn planar sense winding on the second outer tooth and wherein said windings are connected in series such that first and second fluxes in each member are subtracted from each other whereby the output from each member is a periodic function centered on zero and having a period equal to the platen period.

7. The sensor according to claim 6, wherein said first member is spaced from said second member by a distance of $p(n+\frac{1}{4})$ where n is any whole number such that said first and second outputs are in phase quadrature.

8. The sensor according to claim 1, wherein each of said first and second magnetic members comprises first and second magnetic structures having first and second teeth spaced by a groove such that said first and second fluxes encircle each groove on each of said magnetic structures.

9. The sensor according to claim 8, wherein the first and second teeth of each of said first and second magnetic structures of each of said first and second members has a width equal to a width of a tooth on the platen and each of said grooves has a width equal to the width of a tooth on the platen.

10. The sensor according to claim 8, wherein the first tooth and the groove of each of said first and second magnetic structures of each of said first and second members has a width equal to a width of a tooth on the platen, and the second tooth of said first and second magnetic structures has a width equal to the platen period.

11. The sensor according to claim 10, wherein a single turn planar drive winding and a single turn planar sense winding is wound around the first tooth of said first and second magnetic structures, said drive and sense windings being separated by an insulator.

12. The sensor according to claim 11, wherein said planar drive and sense windings define a plane substantially parallel to a surface of said platen.

13. The sensor according to claim 11, wherein the sense winding around the first tooth of the first magnetic structure is wound in an opposite electrical sense to the sense winding on the first tooth of the second magnetic structure and connected in series, the drive winding around the first tooth of the first and second magnetic structures are wound in the same electrical sense and are connected in series, whereby the signals from the first and second fluxes in each member are subtracted from each other such that the output from each member is a periodic function centered on zero and has a period equal to the platen period.

14. The sensor according to claim 11, wherein the drive winding around the first tooth of the first magnetic structure is wound in an opposite electrical sense to the drive winding on the first tooth on the second magnetic structure and are connected in series, the sense winding around the first tooth of the first and second magnetic structures are wound in the same electrical sense and are connected in series, whereby the first and second fluxes in each member are opposite to each other such that the combined output from both members is a periodic function centered on zero and has a period equal to the platen period.

15. The sensor according to claim 11, wherein said first magnetic structure is spaced from said second magnetic structure of said first and second members by a distance of 1½ platen periods and said first member is spaced from said second member by a distance of $p(n+¼)$ where n is any whole number such that said first and second outputs are in phase quadrature.

16. The sensor according to claim 9, wherein the first tooth of each magnetic structure is comprised of a center section spaced from two end sections by first and second openings.

17. The sensor according to claim 16, wherein a single turn planar drive winding is wound around the first tooth of each magnetic structure and extends the entire length thereof, a single turn planar sense winding is wound around the center section and the two openings in the first tooth of each magnetic structure.

18. The sensor according to claim 17, wherein said planar drive and sense windings define a plane substantially parallel to a surface of said platen.

19. The sensor according to claim 17, wherein the sense winding around the first tooth of the first magnetic structure is wound in an opposite electrical sense to the sense winding on the first tooth of the second magnetic structure and connected in series, the drive winding around the first tooth of the first and second magnetic structures are wound in the same electrical sense and are connected in series, whereby the first; and second fluxes in each member are subtracted from each other such that the output from each member is a periodic function centered on zero and has a period equal to the platen period.

20. The sensor according to claim 17, wherein said first magnetic structure is spaced from said second magnetic structure of said first and second members by a distance of 1½ platen periods and said first member is spaced from said second member by a distance of $p(n+¼)$ where n is any whole number such that said first and second outputs are in phase quadrature.

21. The sensor according to claim 1, wherein the selected pairs of sense windings are disposed on the same magnetic member.

22. The sensor according to claim 1, wherein the selected pairs of sense windings are disposed on different magnetic members.

23. A sensor for sensing a position of a linear motor relative to a platen comprising:
    first and second members disposed adjacent to said platen, first and second drive elements disposed on said first and second members respectively, for establishing at least two magnetic fluxes in each of said first and second members, each of said magnetic fluxes being symmetrical about a center of its respective drive element, said magnetic fluxes varying as the position of the sensor over the platen changes, and
    at least one sensing element disposed on each of said first and second members for producing signals which are periodic functions of the position of the respective magnetic member with respect to the platen, selected pairs of said sense windings being connected in voltage differencing relation therein producing an output which is the difference of the signals of said selected pairs of sense windings, and wherein said drive elements and said sensing elements are colinear along an axis of motion defined by the change in position of the sensor over the platen.

24. The sensor according to claim 23, wherein said first and second drive means comprises first and second drive windings wound around a horizontal portion of the first and second members respectively.

25. The sensor according to claim 24 wherein said first and second sense means comprises first and second sense windings wound around a vertical portion of said first and second members respectively.

26. The sensor according to claim 25, wherein each of said drive windings comprises $N_a$ turns and each of said sense windings comprises $N_s$ turns.

27. The sensor according to claim 26, wherein $N_a = N_s$.

28. The, sensor according to claim 26, wherein said platen comprises first and second sets of parallel uniformly spaced grooves formed in a platen surface for defining an orthogonal matrix of teeth.

29. The sensor according to claim 28, wherein each of said first and second members include four pole pieces, said first and second drive windings being wound around the center two pole pieces of said first and second members respectively.

30. The sensor according to claim 29, wherein each of said pole pieces of the first and second members have a plurality of teeth with a pitch p, equal to a pitch of the platen, a spacing between a center line of a selected pole piece and a center line of an adjacent pole piece on the same member being $p(n±¼)$ where n is any whole number.

31. The sensor according to claim 30, wherein a pole piece of said first member and a corresponding pole piece of said second member having a spacing between center lines thereof of $p(n±¼)$ such that said first and second outputs are in phase quadrature.

* * * * *